United States Patent [19]

Nishiyama

[11] Patent Number: 4,601,099
[45] Date of Patent: Jul. 22, 1986

[54] METHOD FOR MANUFACTURING A MAGNETIC HEAD

[75] Inventor: Toyoo Nishiyama, Tokyo, Japan

[73] Assignee: Olympus Optical Co., Ltd., Tokyo, Japan

[21] Appl. No.: 550,252

[22] Filed: Nov. 9, 1983

[30] Foreign Application Priority Data

Nov. 22, 1982 [JP] Japan ................... 57-205251

[51] Int. Cl.⁴ ............................. G11B 5/127
[52] U.S. Cl. ...................... 29/603; 360/119;
360/122; 360/125; 360/126
[58] Field of Search ............. 29/603; 360/119, 121,
360/122, 125, 126, 127

[56] References Cited

U.S. PATENT DOCUMENTS 3,751,803  8/1973  Fisher et al. .

FOREIGN PATENT DOCUMENTS 74321    6/1977   Japan ........................ 29/603
45196    3/1980   Japan ........................ 29/603
135321   10/1980  Japan ........................ 29/603
71814    6/1981   Japan ........................ 29/603
88517    6/1982   Japan ........................ 29/603
68213    4/1983   Japan ........................ 29/603

Primary Examiner—Howard N. Goldberg
Assistant Examiner—Joseph M. Gorski
Attorney, Agent, or Firm—Frishauf, Holtz, Goodman & Woodward

[57] ABSTRACT

A magnetic head is made by forming a first half core having at least two substantially parallel plane surfaces and one lateral surface, the distance between the two plane surfaces being equal to or greater than a predetermined track width fixing one of the two plane surfaces of the first half core on part of one plane surface of a non-magnetic substrate so that the one lateral surface of the first half core meets with the one plane surface of the substrate, and depositing a magnetic insulator to a substantially uniform thickness on the other of the two plane surfaces and the one lateral surface of the first half core and the remaining part of the one plane surface of the substrate, thereby forming a gap spacer, depositing the same material for the first half core to a substantially uniform thickness on the gap spacer film, thereby forming a second half core having a thickness equal to or greater than the predetermined track width, and removing at least part of the gap spacer film lying on the other plane surface of the first half core and part of the second half core lying on said part of the gap spacer film to be removed from the other plane surface of the first half core, thereby forming a magnetic head.

13 Claims, 3 Drawing Figures

METHOD FOR MANUFACTURING A MAGNETIC HEAD

BACKGROUND OF THE INVENTION

The present invention relates to a method for manufacturing a magnetic head, and more specifically to a method for manufacturing a magnetic head, permitting a reduction of the width of a track on a magnetic recording tape.

It is desired that an apparatus using a magnetic recording tape, especially a video tape recorder, should be improved in information recording density and in long-time recording performance.

To meet this requirement, magnetic recording tapes of a high magnetic coercive force type have gradually come to be used. However, when the currently prevailing ferrite-type magnetic head is used for the magnetic recording tape of the high magnetic coercive force type, the performance of the magnetic recording tape of this type will not be fully enjoyed. Thus, metallic type magnetic heads formed from e.g., Sendust, permalloy or amorphous magnetic material, which can fully enjoy the advantages of the magnetic recording tape of this type, have been gradually becoming popular.

From a user's standpoint, however, the metallic type magnetic heads are subject to a defect such that they are more expensive than the ferrite-type magnetic heads, since the material cost of the former is higher than that of the latter.

From a manufacturer's point of view, on the other hand, the metallic type magnetic heads have a defect such that the yield of material is not very good. The reason is that they are manufactured in the same manner as the conventional ferrite-type heads, that is, by separately forming each one of a pair of cores from a magnetic material by grinding and then pasting them together with a non-magnetic gap spacer material between them, despite the use of the expensive material. Moreover, the pasting work requires much time and much labor, so that the manufacturing cost cannot be lowered.

Since the gap spacer is formed by rolling a non-magnetic material, the magnitude of the reduction of the width of the gap between the cores is limited.

SUMMARY OF THE INVENTION

The present invention is contrived in consideration of these circumstances, and is intended to provide a method for manufacturing a magnetic head enjoying improved yield of material as well as ease of manufacture, and capable of substantially reducing the width of the gap between a pair of cores.

The object of this invention is achieved by a method for manufacturing a magnetic head, comprising forming from a material block for a magnetic head core a first half core having at least two substantially parallel plane surfaces and one lateral surface, the distance between the two plane surfaces being equal to or greater than a predetermined track width, fixing one of the two plane surfaces of the first half core on part of one plane surface of a non-magnetic substrate so that the one lateral surface of the first half core intersects the one plane surface of the substrate, depositing a magnetic insulator to a substantially uniform thickness on the other of the two plane surfaces and the one lateral surface of the first half core and the remaining part of the one plane surface of the substrate, thereby forming a gap spacer film to serve as a gap spacer, depositing the same material for the first half core to a substantially uniform thickness on the gap spacer film, thereby forming a second half core having a thickness equal to or greater than the predetermined track width, and a removing at least part of the gap spacer film lying on the other plane surface of the first half core and part of the second half core lying on said part of the gap spacer film to be removed from the other plane surface of the first half core, so that the first half core, part of the gap spacer film on the one lateral surface of the first half core, and that part of the second half core which lies on part of the gap spacer film on the one lateral surface of the first half core and said remaining part of the one plane surface of the substrate constitute a pair of cores for a magnetic head.

The method of the present invention is especially advantageous when used in manufacturing a magnetic head in which the first and second half cores are formed from Sendust, permalloy or amorphous magnetic material.

Also, the method of the invention is especially advantageous when used in manufacturing a magnetic head in which the one lateral surface of the first half core is inclined at an acute angle to the one plane surface of the substrate, that is, a magnetic head used in a video tape recorder of a helical scanning system.

In the method of the invention, the first half core is preferably fixed to the aforesaid part of the one plane surface of the substrate by means of an adhesive agent. Thus, the fixation of the first half core on the substrate can most easily be achieved at the lowest cost.

In the method of the invention, moreover the magnetic insulator is preferably formed from silicon dioxide, chromium or copper when the first and second half cores are formed from Sendust, permalloy or amorphous magnetic material.

In the method of the invention, the magnetic insulator and the second half core are preferably deposited by sputtering, vacuum evaporation or electrode-position. Thus, the magnetic insulator and the second half core may be formed relatively easily with improved yield of material and at relatively low cost.

In the method of the invention, moreover, the second process is preferably preceded by a process for forming in the remaining portion of the one plane surface of the substrate an opening through which a conducting line to form a coil is to be passed.

According to one aspect of the invention, the opening may be formed after the removing step. However, if the opening is formed before the fixing step, then it is unnecessary to remove the parts of the gap spacer film and the second half core for the formation of the opening. Thus, the materials for the gap spacer film and the second half core may be saved, and the process for removing the materials to make the opening may be omitted.

In the method of the invention, furthermore, the aforesaid part of the gap spacer film lying on the other plane surface of the first half core and the part of the second half core lying on the part of the gap spacer film to be removed from the other plane surface of the first half core are preferably removed only from regions near and along the sliding contact surfaces of the pair of cores to be in sliding contact with a magnetic recording tape.

By doing this, the areas of the end surfaces, which are facing each other through the gap, of the cores near around the sliding contact surfaces of the pair of cores are reduced. As a result, the magnetic resistance of those portions of the cores near the sliding contact surfaces is increased to improve the operating efficiency of the magnetic head. Since the magnetic resistance of the other end portions, in which the gap spacer film and the second half core are not removed, of the cores is lower than that of the portions near around the sliding contact surfaces, the operating efficiency of the magnetic head is further improved.

One embodiment of the present invention will now be described in detail with reference to the accompanying drawings.

It is to be noted that individual components or members shown in these drawings are based on different scales for the ease of illustration.

DETAILED DESCRIPTION OF THE PREFERRED EMBODIMENT

Figure 1:
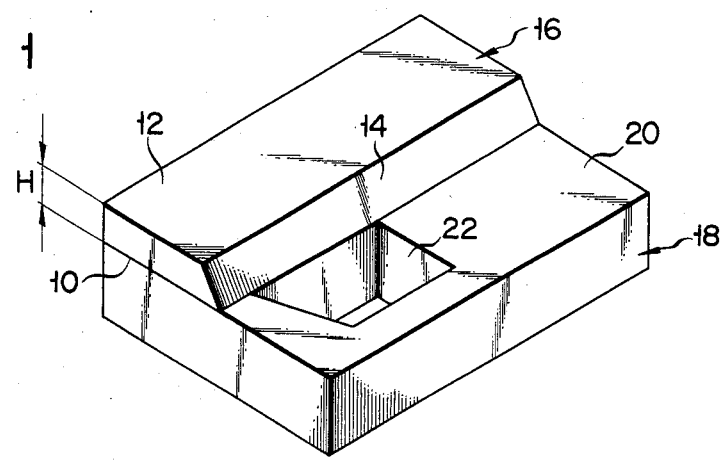
FIG. 1 is a perspective view schematically showing a structure obtained after completion of a second process of an embodiment according to this invention.

First, a first half core 16, which has two parallel plane surfaces 10, 12 and one lateral surface 14 intersecting the plane surfaces 10, 12, is formed from a material block for a magnetic head core. The distance H between the two plane surfaces 10, 12 is equal to or greater than a predetermined track width. Then, the one plane surface 10 of the first half core 16 is fixed on part of one plane surface 20 of a non-magnetic substrate 18 formed of e.g., vitreous material by using an adhesive agent, as shown in FIG. 1. Thus, the lateral surface 14 of the first core half 16 intersects the plane surface 20 of the substrate 18.

In this embodiment, Sendust, permalloy or amorphous magnetic material is used as the material for the magnetic head core. The substrate 18 has a substantially rectangular plane shape, and an opening 22 through which a conducting line to form a coil is to be passed is previously formed in the remaining part of the plane surface 20 of the substrate 18. The two plane surfaces 10 and 12 of the first half core 16 have a substantially rectangular plane shape, and the outer edge of the aforesaid part of the plane surface 20 of the substrate 18 is substantially in line with that of the one plane surface 10 of the first half core 16. The lateral surface 14 of the first half core 16 is inclined at an acute angle to the plane surface 20 of the substrate 18. In this embodiment, the distance H ranges from 30 to 60 microns.

Figure 2:
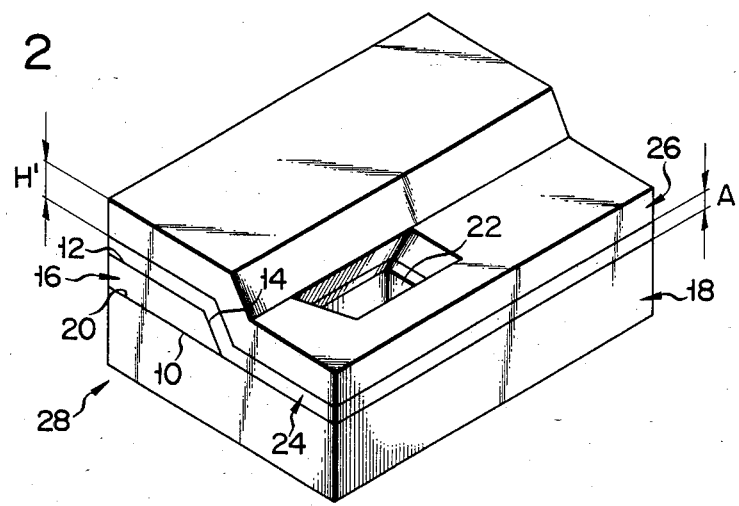
FIG. 2 is a perspective view schematically showing a structure obtained after completion of a fourth process of the embodiment according to this invention.

Subsequently, a magnetic insulator, such as silicon dioxide, chromium or copper, is uniformly deposited to a desired thickness on the other plane surface 12 and the lateral surface 14 of the first half core 16 and the remaining part of the plane surface 20 of the substrate 18 by, for example, sputtering, vacuum evaporation or electrodeposition. Thus, a gap spacer film 24 is formed as shown in FIG. 2. In this embodiment, the thickness A ranges from 0.2 to 0.3 micron.

Further, the same material of the first half core 16 is uniformly deposited on the gap spacer film 24 up to a thickness H' equal to the thickness H of the first half core 16 by, for example, sputtering, vacuum evaporation or electrodeposition. Thus, a second half core 26 is formed as shown in FIG. 2. Naturally, the second half core 26 may be formed from Sendust, permalloy or amorphous magnetic material, and its thickness H' ranges from 30 to 60 microns.

Figure 3:
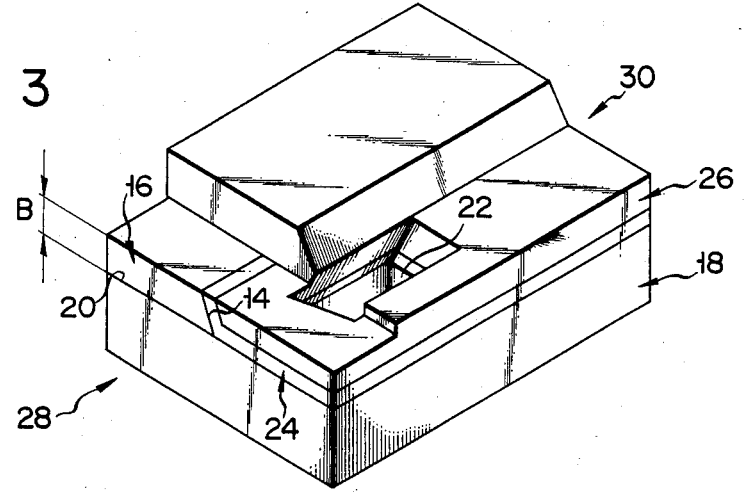
FIG. 3 is a perspective view schematically showing a structure obtained after completion of a fifth process of the embodiment according to this invention.

Then, part of that portion of the gap spacer film 24 which lies on the other plane surface 12 of the first half core 16 and that part of the second half core 26 which lies on such part of the gap spacer film 24 are removed by, for example, grinding, as shown in FIG. 3.

In this embodiment, the respective fore end surfaces of the substrate 18, the first half core 16, the gap spacer film 24, and the second half core 26 shown in FIG. 2 are also in line with one another, to constitute a sliding contact surface 28 to be in sliding contact with a magnetic recording tape (not shown). The first half core 16, part of the gap spacer film 24 on the lateral surface 14 of the first half core 16, and the remaining portion of the second half core 26 (i.e., that part of the second half core 26 which lies on part of the gap spacer film 24 on the lateral surface 14 of the first half core 16 and the aforesaid remaining part of the plane surface 20 of the substrate 18) constitute a pair of metal type cores to serve as a magnetic head having a thickness B.

Finally, a conducting line (not shown) is passed through the opening 22 to form a coil. Thus, a magnetic head 30 is completed.

The traveling direction of the magnetic recording tape (not shown) to be in contact with the sliding contact surface 28 of the magnetic head 30 manufactured in this manner is substantially at right angles to the lateral surface 14 of the first half core 16. Thus, the magnetic head 30 is used in a video tape recorder of a helical scanning system.

Provided with the pair of cores consisting of the first and second half cores 16, 26 and the gap spacer film 24, the magnetic head 30 can bring out the best performance of a magnetic recording tape of a high magnetic coercive force type. Since the gap spacer film 24 and the second half core 26 are formed by sputtering, vacuum evaporation or electrodeposition, their materials may be improved in yield. In addition, the manufacture is eased, and the manufacturing cost can be reduced. Since the gap spacer film 24 is formed by sputtering, vacuum evaporation or electrodeposition, the thickness A of the gap spacer film 24 can be made much narrower than that of a prior art gap spacer which is formed by rolling.

Accordingly, the width of the track on the magnetic recording tape (not shown) can be reduced, so that information can be recorded on the tape at high density for a long time.

In this embodiment, the part of that portion of the gap spacer film 24 which lies on the other plane surface 12 of the first half core 16 and that part of the second half core 26 which lies on such part of the gap spacer film 24 to be removed from the other plane surface 12 of the first half core 16 are removed only from regions near and along the sliding contact surface 28 of the pair of cores. Therefore, the volume of the cores of the magnetic head 30 is reduced, that is, the areas of the end surfaces, which are facing each other through the gap, of the cores are reduced, in the regions near the sliding contact surface 28 to increase the magnetic resistance of these regions. Thus, the magnetic head 30 may be improved in operating efficiency. Since the gap spacer film 24 and the second half core 26 are not removed from the other end portions of the magnetic head 30, the magnetic resistance of the other end portions are reduced. Thus, the magnetic head 30 may further be improved in operating efficiency.

Although an illustrative embodiment of the present invention has been described in detail herein, it is to be understood that the invention is not limited to the precise embodiment, and that various changes and modifications may be effected therein by one skilled in the art without departing from the scope or spirit of the invention.

For example, the opening 22 for the conducting line for coil may be formed after the gap spacer film 24 is formed on the substrate 18 and the first half core 16, or after the second half core 26 is formed on the gap spacer film 24, or after the parts of the gap spacer film 24 and the second half core 26 are removed by grinding.

Further, the lateral surface 14 of the first half core 16 may be at right angles to the plane surface 20 of the substrate 18, instead of being inclined at an acute angle to the plane surface 20.

The magnetic recording tape applicable to the magnetic head 30 manufactured by the method of the present invention is not limited to a magnetic tape of a high magnetic coercive force type. Therefore, any material may be used for the pair of cores 16, 26 of the magnetic head 30, provided it can be deposited on the gap spacer film 24 by sputtering, vacuum evaporation or electrodeposition.

Likewise, any non-magnetic material may be used for the gap spacer film 24, provided it can be deposited on the first half core 16 and the substrate 18 by sputtering, vacuum evaporation or electrodeposition.

What is claimed is:

1. A method for manufacturing a magnetic head, the method comprising the steps of:
    forming, from a material block, a first half core having at least two substantially parallel plane surfaces and one lateral surface, wherein a distance between the at least two substantially parallel plane surfaces is at least equal to a predetermined track width;
    fixing a first of the at least two substantially parallel plane surfaces into part of one plane surface of a non-magnetic substrate, so that the one lateral surface meets with the one plane surface of the substrate, wherein said one plane surface has a remaining part onto which said first half core is not fixed;
    depositing a magnetic insulator to a substantially uniform thickness onto a second of the at least two substantially parallel plane surfaces onto said one lateral surface, and onto the remaining part of said one plane surface of the substrate, thereby forming a gap spacer film to serve as a gap spacer;
    depositing a second material, which is the same as the material from which the first half core is formed, to a substantially uniform thickness to a part of the magnetic insulator that is on the second of the at least two substantially parallel plane surfaces, and depositing said second material onto a part of the magnetic insulator that is on said one lateral surface, thereby forming a second half core having a thickness that is at least equal to the predetermined track width; and
    removing, from regions near and along sliding contact surfaces of said first half core and said second half core which contact surfaces are adapted to be in sliding contact with a magnetic recording tape, said part of the magnetic insulator that is on the second of the at least two substantially parallel plane surfaces, and removing, from said regions, that part of the second material that is on said part of the magnetic insulator that is on the second of the at least two substantially parallel plane surfaces, so that the first half core, part of the magnetic insulator that is on the said one lateral surface that part of the second material which is on the part of the magnetic isulator that is on said one lateral surface, and said remaining part of said one plane surface of the substrate constitute a pair of cores for a magnetic head.

2. The method according to claim 1, wherein said first and second half cores are formed from a material selected from the group consisting of Sendust, permalloy and amorphous magnetic material.

3. The method according to claim 2, wherein said one lateral surface is inclined at an acute angle relative to said one plane surface of the substrate.

4. The method according to claim 2, wherein said first half core is fixed to said part of said one plane surface of the substrate by means of an adhesive agent.

5. The method according to claim 2, wherein said magnetic insulator is formed from a material selected from the group consisting of silicon dioxide, chromium and copper.

6. The method according to claim 5, wherein said magnetic insulator and said second half core are deposited by sputtering.

7. The method according to claim 5, wherein said magnetic insulator and said second half core are deposited by vacuum evaporation.

8. The method acording to claim 5, wherein said magnetic insulator and said second half core are deposited by electrodeposition.

9. The method according to claim 1, wherein said fixing step is preceded by a step of forming in said remaining portion of said one plane surface of the substrate an opening through which a conducting line to form a coil is to be passed.

10. The method according to claim 1, wherein said part of the magnetic insulator that is on the second of the at least two substantially parallel plane surfaces, and said part of the second material that is on said part of the magnetic insulator that is on the second of the at least two substantially parallel plane surface are removed only from regions near and along sliding contact surfaces of said pair of cores to be in sliding contact with a magnetic recording tape.

11. The method according to claim 1, wherein said one lateral surface is inclined at an acute angle to said one plane surface of the substrate.

12. The method according to claim 1, wherein said first half core is fixed to said part of said one plane surface of the substrate by means of an adhesive agent.

13. The method according to claim 1, wherein said magnetic insulator is formed from a material selected from the group consisting of silicon dioxide, chromium and copper.

* * * * *